Figure 1:
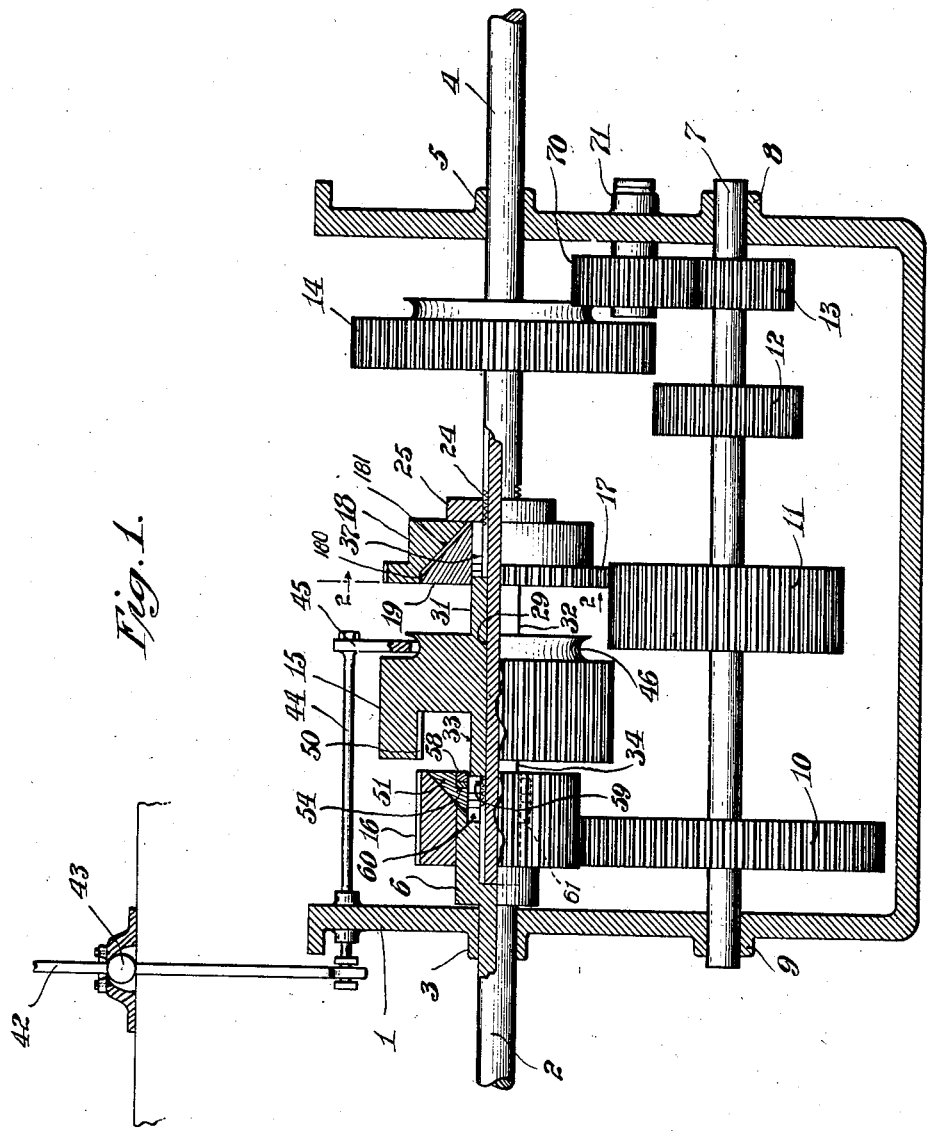

July 12, 1932.  W. P. ALBERT  1,866,614
VARIABLE TRANSMISSION MECHANISM
Filed April 9, 1924   3 Sheets-Sheet 1

INVENTOR
W. P. Albert
BY
his ATTORNEY

July 12, 1932.  W. P. ALBERT  1,866,614
VARIABLE TRANSMISSION MECHANISM
Filed April 9, 1924   3 Sheets-Sheet 2
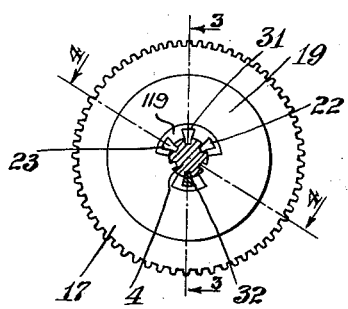
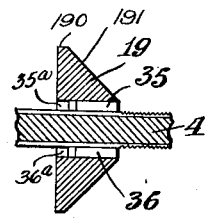
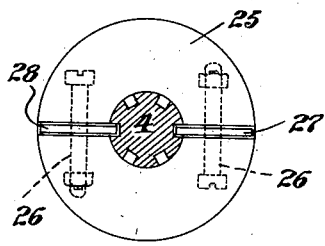
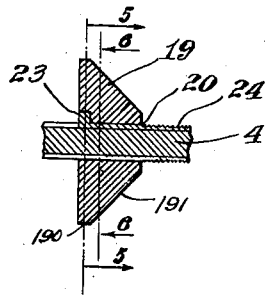
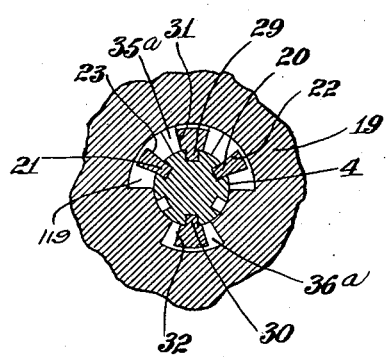
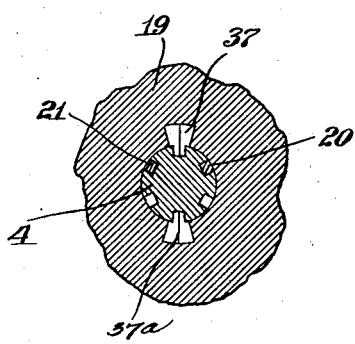
INVENTOR
W. P. Albert
BY
ATTORNEY

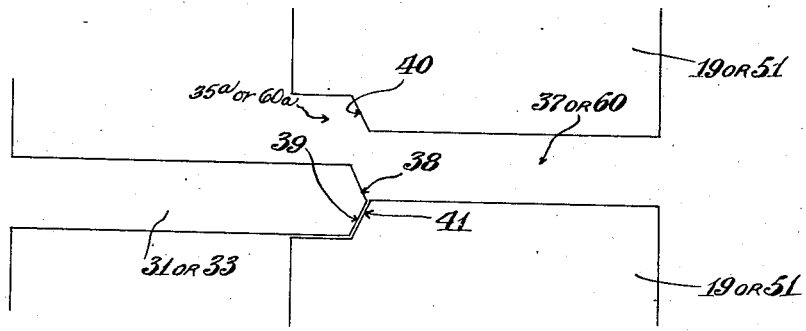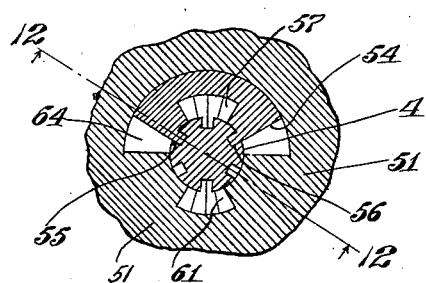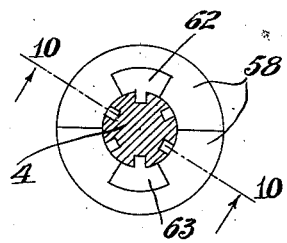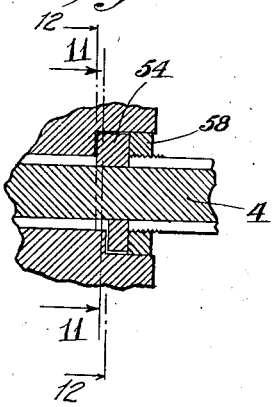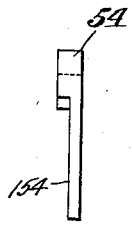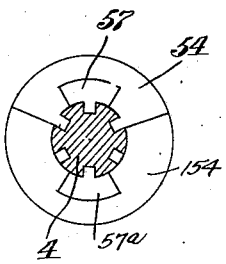

Patented July 12, 1932

1,866,614

UNITED STATES PATENT OFFICE

WALTER P. ALBERT, OF EAST ORANGE, NEW JERSEY, ASSIGNOR TO HAROLD O. VAN ANTWERP, OF GRAND RAPIDS, MICHIGAN

VARIABLE TRANSMISSION MECHANISM

Application filed April 9, 1924. Serial No. 705,263.

This invention relates to improvements in variable transmission mechanism and particularly to a speed-change mechanism applicable to motor cars.

It is the object of the present invention to provide a new and improved arrangement in which the driving and driven elements of a transmission system may be geared together at different speeds, but in which the proper intermeshing of gears or jaw clutch elements does not depend exclusively on the skill of the operator. With this object in view, when it is desired to interconnect the driving and driven elements at a certain speed ratio, such ratio is first established preferably through the agency of frictionally operating means. As soon as the desired speed ratio is attained, the frictional means are released and the gears or jaw clutch elements are permitted to be thrown into mesh under the direct control of the operator.

The arrangement is so provided that the frictional means is operated as an incident to the gear or clutch shifting operation, whereby in case the shifting from one speed to another is attempted while the driving and driven shafts are rotating at other than the desired speed ratio, then the operator will encounter resistance to the shifting of the gears or jaw clutch elements and in attempting to overcome this resistance will cause the establishment of the desired ratio through the frictional means which acts to speed up or slow down the driven shaft.

The frictional means is at all times under the direct control of the operator and offers a resistance to his attempt to shift gears. This resistance is, of course, felt by the operator and it is proportional to the difference between the desired and existing speed ratios. The resistance of the frictional means may be overcome by a light force applied for a relatively long period of time, or by a strong force applied for a short period.

In accordance with a further feature of the invention, no resistance is offered to the jaw clutch or gear-shifting operation and the frictional means does not operate if the jaw clutch or gear-shifting occurs at the proper time, i. e., when the desired ratio exists between the driving and driven members.

These and other features of the invention will more clearly appear from the following detailed description of an embodiment of the invention as applied to the drawings, which illustrate as much of the transmission mechanism of a motor car as is necessary for a clear understanding of the present invention.

In said drawings: Fig. 1, is a side elevation partly in section; Fig. 2 is a vertical cross-section along lines 2—2 of Fig. 1; Fig. 3 is a sectional view along lines 3—3 of Fig. 2 showing the friction cone 19 as it appears on the shaft; Fig. 4 is a sectional view along lines 4—4 of Fig. 2; Figs. 5 and 6 are enlarged (as compared with Fig. 1) sectional views along lines 5—5 and 6—6, respectively, of Fig. 4; Fig. 7 is an enlarged schematic top view of part of the frictional clutch mechanism showing one of the sliding keys and its keyway; Figs. 8 and 9 are end views of the split collars 25 and 58 shown positioned on the shaft; Fig. 10 is a sectional view along a line corresponding to 10—10 of Fig. 9; Fig. 11 is a sectional view along line 11—11 of Fig. 10; Fig. 12 is a sectional view along line 12—12 of Fig. 10; and Fig. 13 is a side elevation of the rotation limiting sector shown in face view in Fig. 12.

In Fig. 1 of the drawings, reference numeral 1 indicates conventionally a gear casing provided in its front and rear walls, respectively, with driving and driven shaft bearings 3 and 5 disposed in alinement, and counter shaft bearings 9 and 8 also in alinement. The driving or power input shaft shown at 2 is journaled in bearing 3. Shaft 2 may be the usual main clutch shaft of an automobile transmission which carries at its forward end one element of the usual clutch (not shown) by which said shaft may be coupled with the engine (not shown). The rear end of driving shaft 2 within casing 1 may be enlarged as shown at 6 and drilled axially to form therein a pilot bearing for the front end of driven or power output shaft 4, which is provided with parallel guide grooves for the splines of the slidable gears and clutch elements mounted thereon and is journaled in bearing 5. Assuming the transmission to be installed in a motor vehicle, shaft 4 serves to transmit the power of the engine from driving shaft 2 at different ratios to the rear vehicle wheels thru the usual propeller shaft and rear axle differential (not shown).

Counter shaft 7, mounted to rotate in said bearings 9 and 8, carries fixedly secured to it four axially spaced power gears 10, 11, 12 and 13, decreasing in diameter in the order stated. Gear 10 is in constant mesh with drive gear 16 fixed to the rearward end of driving shaft 2. An idler gear 70, supported by the rear wall of casing 1, as at 71, is in constant mesh with counter shaft gear 13.

Slidably keyed to driven shaft 4 are power gears 14 and 15 of which gear 14 is the larger in diameter and is adapted to be meshed either with counter shaft gear 12 or idler gear 70. Gear 15 is adapted to be slid rearward into mesh with counter shaft gear 11, or forward into direct positive clutching engagement with gear 16 by means to be described.

If gear 14 be moved forward to mesh with gear 12 it is obvious that shaft 4 may be rotated from shaft 2 thru the train composed of gears 16, 10, countershaft 7 and gears 12 and 14, at a lower speed and in the same direction. When gears 12 and 14 are in mesh the transmission is in so-called low gear. If gear 14 be moved rearward to mesh with idler gear 70, it is obvious that shaft 4 may be rotated from shaft 2 thru gears 16, 10, counter shaft 7, gears 13, 70 and 14, at a low speed in the direction opposite that of shaft 2. When gears 13, 70 and 14 are in mesh the transmission is in so-called reverse gear.

Gear 14 may be moved by the operator by means of any conventional control mechanism, which is not illustrated, as this mechanism and the trains controlled by it are not a part of this invention.

The forward face of slidable gear 15 on shaft 4 is hollowed, as shown, and equipped with internal clutch teeth or jaws 50 machined in the inner perimeter of the overhanging annulus thus formed on the forward half of said gear. Clutch teeth or jaws 50 are proportioned and disposed in such position that when gear 15 is moved axially forward said clutch teeth may mesh or interlock with corresponding external teeth on gear 16 fixed to power input shaft 2. The clutch teeth on gear 16 may be continuations rearward of the external gear teeth that intermesh with the teeth of countershaft gear 10, gear 16 having been given an axial dimension enough greater than that of gear 10 that the internal clutch teeth 50 of gear 15 may be completely interlocked with the external clutch teeth of gear 16 without interfering with gear 10. When gear 15 is clutched as described with gear 16, and gear 14 is in neutral (the position of said gear shown in Fig. 1) it is obvious that shaft 4 may be rotated from shaft 2 in the same direction at the same speed, since in this condition the two shafts are rotatively locked together and function as one continuous shaft, the counter shaft gears then rotating idly, and the transmission being in so-called high gear.

If gear 15 be moved rearward its teeth may be intermeshed with the teeth of counter shaft gear 11. In this condition shaft 4 may be driven from shaft 2 thru gears 16, 10, countershaft 7, gear 11 and gear 15. The transmission is then in so-called intermediate gear.

Fig. 1 illustrates, conventionally, a means whereby the operator or driver may shift gear 15 either into high gear or intermediate gear. A hub on the rearward face of said gear 15 is shown provided with a groove 46 engaged by a shift yoke 45 which is fixed to a shift rod 44, slidable in a slide bearing formed in the front wall of casing 1. The forward end of slide rod 44 is adapted to be selectively engaged at the will of the operator by the lower end of a manual shift lever 42 universally fulcrumed at 43.

The combinations and arrangements of elements thus far described are not of applicant's invention and are believed to be substantially typical of sliding gear transmissions in hitherto common use in motor vehicles.

The new combinations and elements shown in the drawings, which illustrate one specific embodiment of the invention, will now be described. As more generally indicated hereinbefore said new combinations and elements function (1) to synchronize the gear tooth speeds of gears 15 and 11, in case they are rotating asynchronously, by frictional power transmitting elements provided with means to oppose intermeshing of the gear teeth with a force proportionate to the difference in rotary speed of the gears to be intermeshed when intermeshing is attempted; one of said frictional power transmitting elements in this case being geared to gear 11 by a synchronizer gear 17; and (2) to synchronize the tooth speeds of the clutch teeth of gears 15 and 16, in case they are asynchronous, by frictional power transmitting elements provided with means to oppose intermeshing of the clutch teeth with a force proportioned to the difference in rotary speed of the toothed clutch elements to be interengaged.

As shown in Fig. 1, synchronizing means is provided herein for high and intermediate speed trains only. Synchronization of low speed and reverse trains is not ordinarily needed; but it is obvious that means identical with that used to synchronize the intermediate gear train can be applied to low or to low and reverse trains if desired.

The means for synchronizing the tooth speeds of power gears 15 and 11 of the intermediate speed train will be first described.

Since gears 15 and 11 rotate about parallel axes spaced apart, rather than about axes lying in the same straight line, as do gears 15 and 16; and since synchronization is effected by coaxial friction clutch elements, it is necessary to provide an additional gear normally loose on driven shaft 4 or counter shaft 7 but capable of being frictionally coupled to said gear 15 or 11 which additional gear is of the same pitch diameter as gear 15 or gear 11, (depending on which shaft said additional gear is carried by) and meshes with the other gear of the intermeshable pair of power gears prior to direct intermeshing of said power gears. In this embodiment said additional gear is mounted on shaft 4 coaxially with slidable gear 15. This additional gear, which may be appropriately designated a synchronizing gear, is indicated by the numeral 17 in the drawings. Gear 17 is in constant mesh with gear 11 and is of the same pitch diameter as gear 15. Hence it always rotates in unison with gear 11 (being normally free on shaft 4) at the same rate of speed that gear 15 would have were it in mesh with gear 11. And if gear 15 (or shaft 4 to which gear 15 is splined) can be first frictionally engaged with synchronizing gear 17, these two gears may be brought to the same tooth speeds by said frictional engagement, which speed is equal to the tooth speed of gear 11, so that in this condition gear 15 may be slid readily into mesh with the teeth of gear 11 if the friction coupling be first released.

The means for frictionally coupling synchronizing gear 17 and power gear 15 will now be described.

Synchronizing gear 17 is provided with a relatively large hub 18 the rearward face of which engages a thrust collar 25 fixed to the shaft 4, (Figs. 1 and 8). Thrust collar 25 is composed of two semi-circular segments bolted together as by bolts 26, and is prevented from rotating about the axis of shaft 4 by means of lock-plates 27 and 28 the inner edges of which interlock with grooves in shaft 4, said plates being held in position between the two semi-circular segments by said bolts 26. Short keys 20 and 21 (Figs. 4, 5 and 6) are seated in other grooves in said shaft. The rearward ends of these keys are corrugated as at 24, and the corrugated ends are clamped by collar 25 so that the keys are prevented from moving longitudinally. The forward ends of keys 20 and 21 have sector-like (in cross section) lugs or heads 22 and 23 (Figs. 2, 4 and 5) projecting slightly outward radially for a purpose to be set forth.

The front face of gear 17 and hub 18 is bored and counter-sunk so as to form a cavity bounded by a cylindrical internal bearing surface 180 and a concave conical friction clutch surface 181 thereby constituting one element of the friction clutch for synchronizing intermediate gears 15 and 11. A co-acting friction clutch element 19 is telescoped within the said cavity. Said element 19 is provided with an external cylindrical bearing surface 190, adapted to be engaged by the internal bearing surface 180 of gear and hub 17—18, and with a convex conical clutch surface 191 adapted to be forced into frictional driving contact with said concave conical clutch surface 181 on the companion member. In the unclutched relation of friction clutch elements 19, and 17—18, the latter may rotate freely on the lubricating oil film always present in normal operation between surfaces 180 and 190, and surfaces 181 and 191, the extent of axial movement of element 19 to effect frictional seizure of the clutch surfaces being very slight. Axial movement of cone clutch element 19 away from its companion element is limited by the before described heads 22 and 23 on keys 20 and 21 which heads engage in a sector-shaped cavity 119 formed in the front face of said clutch element 19, as illustrated in Figs. 2, 4 and 5. Said keys are shown as angularly spaced 120° apart, more or less, and are so positioned with reference to each other and the sector-shaped cavity (which is shown as of approximately 180°) that the clutch element 19 may rotate a limited extent on shaft 4 before the end walls of the cavity meet the heads 22 and 23 of said keys 20 and 21.

Cone clutch element 19 is formed with channels or ways entirely thru it. In the illustrated embodiment two such channels are provided indicated as a whole at 35 and 36 in Figs. 3, 5 and 6. One only of these channels is visible in Fig. 1. Channels 35 and 36 have narrow portions 37 and 37a which are sector-shaped in cross section, their sides being radial planes with respect to the axis of shaft 4 and clutch element 19. The front ends of these channels expand into wider portions 35a and 36a as well shown in the schematic or diagrammatic view Fig. 7. The side walls of said wider portions 35a and 36a are also radial planes. Between the side walls of the narrower portions 37 and 37a and the side walls of wider portions 35a and 36a are detent or checking elements shown as surfaces sloping in a chordal plane or, more accurately, spiral surfaces 40 and 41, (Fig. 7) having a very important function to be hereafter explained. By inspection of Fig. 5, it will be perceived that the forward end of channel 35 communicates with said sector-like cavity 119 in cone clutch element 19 at the mid portion of the cavity so that the rear wall of said cavity on each side of channel 35—35a is adapted to encounter the rear faces of heads 22 and 23 in order to limit forward movement of clutch element 19. Thus it will be perceived that cone friction clutch element 19 is limited in the extent of its forward releasing movement by the heads 22 and 23 of keys 20 and 21, and is also in lost motion driving connection with shaft 4 by means of said key heads 22 and 23 and the end walls of the cavity 119.

Slidable gear 15, which is adapted to be meshed with gear 11 to procure intermediate speed, is provided with a plurality of internal splines or guide ribs fitted to grooves in shaft 4. Fig. 5 shows two of these splines 29 and 30 disposed diametrically opposite one another. Fingers such as 31 and 32, rigid with gear 15, project rearward. The splines 29 and 30 extend along the fingers and reinforce them. Fingers 29 and 30 are of cross sectional dimensions to slide nicely in the narrow portions and of such length that when the gear 15 is in neutral position, as illustrated in Fig. 1, midway between gears 11 and 16, the finger ends extend into the enlarged forward end portions 35a and 36a of channels 35 and 36. The ends of fingers 31 and 32 have detent or checking components such as sloping surfaces 38 and 39 adapted to cooperate with the corresponding components 40 and 41 of cone clutch element 19 as illustrated in Fig. 7. Fingers 31 and 32 are of a width to permit the same extent of angular movement of cone clutch element 19 with respect to said shaft 4 and said fingers when their ends are disposed within the spaces 35a and 36a as that permitted by the key heads 22 and 23. Thus, if gear 15 be moved forward to clutch shaft 4 directly to shaft 2, thereby drawing the ends of fingers 31 and 32 free of the enlarged front end portions 35a and 36a, the key heads 22 and 23 will restrain angular movements of cone clutch element 19 so that when gear 15 is again restored to neutral position the ends of the fingers will easily enter said portions 35a and 36a.

The means for synchronizing the tooth speeds of the clutch teeth on gear 16, secured to driving shaft 2, and the clutch 50 on gear 15 splined to driven shaft 4 to produce the high gear coupling will now be described.

Rearward face of gear 16 and enlargement 6 of shaft 2, are concaved to form an internal conical friction clutch surface as shown in Fig. 1. An externally conical friction clutch element 51 telescoped within the concavity of gear 16 cooperates with the concave surface of said gear. The rearward portion of gear 16 in cooperation with element 51 constitutes a friction clutch for synchronizing gears 15 and 16 that functions with respect to high gear similarly to the cone friction clutch described for synchronizing intermediate gear.

Cone clutch element 51 is drivingly connected to shaft 4 by a lost motion connection so that said element may rotate only a limited angular extent on shaft 4. The means of connection comprises an element provided with a sector part 54 keyed to shaft 4 at 55 and 56 (Fig. 11). Sector part 54 has an angular extent of say 120° and is disposed within a sector-like chamber 64 of greater angular extent (say 180°) so that some angular movement is permitted to cone clutch element 51 before the ends of sector part 54 contact with the end walls of sector-like chamber 64. Chamber 64 and sector part 54 function to limit angular movement of clutch element 51 in substantially the same manner as the key heads 22 and 23 and sector-like chamber 119 functions with respect to cone clutch element 19 as previously described. Sector part 54 is slotted at 57. It is attached to or integral with a thinner portion 154 which is similarly slotted at 57a 180° from the slot 57 and forms with sector part 54 a circular element sleeved on shaft 4.

Cone clutch element 51 is limited in rearward axial movement by a split collar 58 clamped to shaft 4 on a corrugated portion thereof as shown in Figs. 1, 9 and 10, and is disposed within a counterbore at the rear of clutch element 51 and rearward of the sector-provided element described. Collar 58 is provided with slots or apertures 62 and 63 of the same size as and registered with the slots 57 and 57a of the sector-provided part 54.

Cone clutch element 51 is also provided with channels 60 and 61 extending throughout its axial dimension. These channels are of dimensions and form similar to the channels 35 and 36 provided in cone clutch element 19 previously described. Their rearward ends are expanded into wider portions corresponding to the wider portions 35a and 36a of channels 35 and 36 formed in clutch element 19 described. Also there are at the junction of the narrower and wider portions of channels 60 and 61 detent or checking components in the form of sloping or spiral surfaces corresponding to the detent or checking surfaces 40 and 41 in cone clutch element 19, described. The slots 57, 57a, in sector-provided element 54, and slots 62 and 63 in split collar 58 are preferably of the same form and dimensions as the wider portions of channels 60 and 61 within cone clutch element 51.

Slidable gear 15 is provided with fingers 33 and 34 projecting forward in line with the rearward projecting fingers 31 and 32 already described. These fingers 33 and 34 have detent or checking components in the form of sloping or spiral surfaces at their extremities similar to the surfaces 38 and 39 on fingers 31 and 32 and functioning similarly in cooperation with the corresponding cooperating checking components within the channels 60 and 61. In neutral position of gear 15 fingers 33 and 34 rest within the slots 62 and 63 of collar 58 and within the slots 57 and 57a of sector-provided rotation-limiting element 54 as well as projecting into the wider spaces such as 60a at the rearward ends of channels 60 and 61, in the same relation to the latter that the fingers 31 and 32 bear to the wider spaces at the front ends of channels 35 and 36 in cone element 19 described. Fingers 33 and 34 permit the same amount of relative rotary movement of cone clutch element 51 that is permitted by the sector 54.

The construction of that embodiment of this invention which is illustrated in the drawings having been described in detail the mode of operation will now be explained.

When the operator desires to transmit the rotation of shaft 2 to shaft 4 at the intermediate speed, he manipulates the shift lever 42 in the proper direction to select and slide gear 15 on shaft 4 rearward or in the right hand direction as the mechanism of Fig. 1 is viewed. If at this moment the speed of gear 15 is the same as that of gear 11, then the light frictional coupling between cone 19 and gear 17 will not be disturbed by the fingers 31 and 32, as the cone will also be rotating at this same speed. Owing to the fact that the whole assembly is moving at the same speed, the fingers 31 and 32 may be centrally positioned within the slots 35 and 36 exactly opposite the narrow channels 37 and 38 (see Fig. 7), and the gear 15 will be free to slide in a right-hand direction. Gears 11 and 15 are so spaced that shortly after fingers 31 and 32 enter channels 37 and 38, gear 15 will engage with its teeth, gear 11 and thus directly couple shaft 4 positively with shaft 2 at the intermediate speed. Owing to the fact that gears 11 and 15 rotate at the same peripheral speed, their teeth will readily mesh. If, however, at the time gear 15 is moved towards gear 11, the latter is rotating faster or slower than the former, i. e., if the speed ratio between shafts 4 and 2 is not the desired one, then the fingers 31 and 32 will not be centrally positioned within the channels 35 and 36, but will be off center and will probably lie respectively against one of the lateral walls of wider spaces 35a and 36a within said channels. When the gear 15 is now moved in a right-hand direction then, depending upon whether the fingers 31 and 32 are at one or the other side of the corresponding spaces 35a and 36a in the cone 19, the sloping ends of these fingers will engage sloping checking-surfaces 40 or 41. Since the gear shifting takes place with the main clutch disengaged, shaft 2 and counter shaft 7 are free to rotate, and shaft 4, driven by the inertia of movement of the car, becomes for the time being the driving shaft. Shaft 4 will now, through the agency of cone 19 and gear 17, bring gear 11 to the proper speed for meshing with gear 15. It is to be noted that the chief force to be overcome is the inertia of rotation, or static inertia if at rest, of countershaft 7 with its gears and shaft 2 with the clutch mechanism. This force causes each finger to cling to one side of the enlarged portions of the corresponding channel and permits considerable end thrust while there is a great difference of speed. The absence of this force of inertia allows fingers 31 and 32 to be moved relatively easily with respect to cone 19 after the gears are brought to approximately the same relative speeds. Owing to this inertia of rotation the resistance that the operator encounters in shifting is proportional to the difference in speed of the gears about to be meshed.

Owing to the fact that synchronizing gear 17 is constantly rotated at the intermediate speed by means of the gear 11, this intermediate speed is now frictionally transmitted to the shaft 4 through the agency of elements 17, 19, 25, 31 and 32. As above stated, gears 15 and 11 are so positioned with respect to each other that they will be separated while the sloping points of fingers 31 and 32 are in engagement with the sloping checking components of channels 35 and 36. As soon as the frictional engagement sufficiently speeds up or slows down the shaft 7, the condition is produced in which the fingers 31 and 32 are easily forced into the narow channel portions 37 and 37a. The gear 15 is now further moved in a right-hand direction into mesh with the gear 11, whereupon the shaft 2 is positively geared to shaft 4 at the intermediate speed through the agency of gears 16, 10, 11 and 15.

That portion of the lever 42 which projects above the ball joint 43 is ordinarily about four or five times as long as the portion projecting below this pivot point. Thus even a slight pressure applied to the lever 42 will result in a considerable thrust by the fingers 31 and 32, sufficient to produce the above described result of the frictional coupling. As above stated, if the operator correctly estimates the relative speeds, the frictional coupling is not called into operation at all, but the shift occurs in the usual manner. If, however, the operator does not clearly gauge the relative speeds, then the frictional clutch is actuated and prevents the intermeshing of the gears until the proper relative speeds exist. The harder the operator pushes on the lever 42, the quicker will he establish the condition where gear 15 is rotating nearly at the peripheral speed of gear 11, i. e., the desired intermediate speed. It is important to note that as soon as finger 31 enters narrow channel portion 37 all axial pressure against cone 19 is removed; hence the friction between cone 19 and gear 17 is reduce to practically zero, so that the gears 11 and 15 are free to rotate with respect to each other. If the frictional coupling between gears 15 and 11 still existed, then in case the gears 11 and 15 clashed with a tooth of one directly against the tooth of the other, it would be impossible or very difficult to move gear 15 into mesh with gear 11. However, as above stated, just as soon as the desired speed relation is established, the inertia force tending to maintain engagement between fingers 31 and 32 and the side walls of the enlarged portions of the channels in cone 19 disappears; the fingers may then be readily advanced into the narrower portions of the channels to permit the teeth of the gears 15 and 11 to engage. When the fingers enter the narrow portions of the channels there is no longer any axial pressure on the clutch surfaces which therefore cease their seizing engagement and allow gears 15 and 11 to be sufficiently free so that if the teeth should meet end to end the gears will adjust themselves to allow intermeshing of the teeth. Just the same as upon encountering the resistance, the operator knows that the desired speed ratio has not yet been attained, the disappearance or absence of such resistance will now inform him that the main clutch may be let in.

When it is desired to rotate the shaft 4 at the speed of shaft 2, then the coupling between these shafts is effected by causing the internal teeth 50 of gear 15 to mesh with the teeth of gear 16. This is effected by moving the gear 15 in a left-hand direction (Fig. 1). The fingers 31 and 32 disengage the cone 19 and the fingers 33 and 34 are moved towards a cone-shaped clutch member 51. The ends of said fingers 33 and 34 then engage with their checking elements the checking components formed within the channels 60 and 61 of the cone clutch element 51 in a manner similar to that described in connection with the synchronization of intermediate speed. The sloping checking surfaces will come in contact on one side or the other dependent upon the direction of relative rotation of shafts 2 and 4. If the rotation of these shafts should happen to be equal in speed the toothed clutch elements will slide readily into mesh without material resistance. If, however, the difference of speed is considerable between shafts 2 and 4 resistance offered by the checking elements in proportion to the difference of speed of shafts 2 and 4 will prevent intermeshing of the clutch teeth until synchronization has been effected thru the friction synchronizing clutch elements.

The operation of the parts in synchronizing high speed is substantially the same as the operation of the parts for synchronizing intermediate speed with the single exception of the functioning of synchronizing gear 17 which is in constant mesh with counter shaft gear 11 in connection with intermediate speed operation.

Obviously, the manner in which the present invention may be embodied into numerous types of transmission systems may be varied without departing from the spirit thereof. One of the important advantages of this invention consists in the ready adaptability thereof to existing types of gear shifting and change-speed mechanisms, and to changing from one to any other speed. The arrangement is so provided that the present design may be retained and, as far as high and intermediate speeds are concerned, the objects of the invention attained by the alteration of one or two gears and the addition of one gear. In prior structures these objects were usually attained by relatively complex structures which could not be adapted to existing types of transmission mechanisms without completely redesigning or extensively altering the latter.

What I claim is:

1. In a variable speed mechanism, driving and driven members, means including gearing for connecting said members to rotate at various speed ratios, means for shifting from one gearing to another, and means for resisting the shifting operation while said members are rotating at another than the desired ratio, the resistance of said means to shifting increasing with an increase in the difference between the existing and desired speed ratios.

2. In a power transmission mechanism, a driving and a driven shaft, a first and a second gear constantly rotated by said driving shaft at a certain and at a lower peripheral speed, respectively, a third gear rotatable with but horizontally displaceable with respect to said driven shaft, mechanism under the control of the operator for moving said third gear into mesh with the first or the second gear, a frictional coupling means between said second gear and said driven shaft means operated in response to the operation of said mechanism but most strongly while the peripheral speed of said third gear is different from that of the second gear frictionally to interconnect said second gear and said driven shaft, and a frictional coupling means between the first gear and the driven shaft means operated in response to the operation of said mechanism but most strongly while the peripheral speed of said first gear is different from that of said third gear, frictionally to interconnect said first gear and said driven shaft.

3. In a power transmission mechanism, a driving and a driven shaft, a first and a second gear rotated by said driving shaft at a certain and at a lower peripheral speed, respectively, two sets of gear teeth rotatable with but horizontally displaceable with respect to said driven shaft, mechanism under the control of the operator for moving one of said sets of gear teeth into mesh with the first gear and the other set into mesh with the second gear, a frictional coupling means between said second gear and said driven shaft means operated in response to the operation of said mechanism but most strongly while the peripheral speed of said other set of gear teeth is different from that of the second gear, frictionally to interconnect said second gear and said driven shaft and a frictional coupling means between the first gear and the driven shaft means operated in response to the operation of said mechanism but most strongly while the peripheral speed of said first gear is different from that of said one of said sets of gear teeth frictionally to interconnect said first gear and said driven shaft.

4. In a power transmission mechanism, a driving and a driven shaft, a first and a second gear constantly rotated by said driving shaft at a certain and at a lower peripheral speed, respectively, a third gear rotatable with but horizontally displaceable with respect to said driven shaft, mechanism under the control of the operator for moving said third gear into mesh with the first or the second gear, a fourth gear loosely mounted on said driven shaft and continuously in mesh with said second gear, a frictional coupling means between said fourth gear and said driven shaft operated in response to the operation of said mechanism but most strongly while the peripheral speed of said third gear is different from that of the second gear frictionally to interconnect said fourth gear and said driven shaft, and a frictional coupling means between the first gear and the driven shaft means operated in response to the operation of said mechanism but most strongly while the peripheral speed of the first gear is different from that of said third gear frictionally to interconnect said first gear and said driven shaft.

5. In a power transmission mechanism, a driving and a driven shaft, a first gear secured to said driving shaft, a countershaft driven by said first gear, a second gear secured to said countershaft, the peripheral speeds of said first and second gears being different, a third gear rotatable with but horizontally displaceable with respect to said driven shaft, said third gear having internal and external teeth, mechanism under the control of the operator for moving said third gear with its internal teeth into mesh with the first gear or with its external teeth into mesh with the second gear, a fourth gear loosely mounted on said driven shaft and continuously in mesh with said second gear, a collar fastened to the driven shaft adjacent to said fourth gear, a cone-shaped clutch member loosely mounted on said driven shaft and having a friction surface in engagement with a corresponding surface of said fourth gear, a second cone-shaped clutch member loosely mounted on said driven shaft and having a friction surface in engagement with a corresponding surface of said first gear, two fingers projecting from said third gear, one in the direction of one and the other in the direction of the other clutch member, a sloping detent surface on the first-mentioned clutch member adapted to be engaged by the corresponding finger, but only while the peripheral speed of the external teeth are different from that of the second gear, to establish a frictional coupling including said collar, fourth gear, first-mentioned friction clutch, finger, driven shaft and second gear, a sloping detent surface on the second-mentioned clutch member adapted to be engaged by the corresponding finger, but only while the peripheral speed of the internal gears is different from that of the first gear, to establish a frictional coupling between the first gear, second-mentioned clutch member, second-mentioned finger and driven shaft.

6. In a power transmission mechanism, a driving and a driven shaft, a countershaft driven by said driving shaft, a first gear secured to said countershaft, a second gear rotatable with but horizontally displaceable with respect to said driven shaft, mechanism under the control of the operator for moving said second gear with its teeth into mesh with the first gear, a third gear loosely mounted on said driven shaft and continuously in mesh with said first gear, a clutch member having a friction surface in engagement with said third gear, and a finger projecting from said second gear into engagement with a checking component on said clutch member but only while the peripheral speeds of the first and second gears are different.

7. In a power transmission mechanism, a driving and a driven shaft, a first gear secured to said said driving shaft, a countershaft driven by said first gear, a second gear secured to said countershaft, the peripheral speeds of said first and second gears being different, a third gear rotatable with but horizontally displaceable with respect to said driven shaft, mechanism under the control of the operator for moving said third gear into mesh with the second gear, a fourth gear loosely mounted on said driven shaft and continuously in mesh with said second gear, a collar fastened to the driven shaft adjacent to said fourth gear, a clutch member loosely mounted on said driven shaft and having a friction surface engagement with a corresponding surface of said fourth gear, a finger projecting from said third gear in the direction of the said clutch member, and a checking component on said clutch member adapted to be engaged by said finger to establish a frictional coupling including said collar, fourth gear, friction clutch, finger, driven shaft and second gear.

8. In a variable speed device, driving and driven members, means including gearing for connecting said members to rotate at various speed ratios, means including a manually operable mechanism for shifting from one gearing to another and retarding means interconnected with said mechanism and actuated as an incident of the shifting operation for resisting the operation of said mechanism, said retarding means comprising a movable element and friction braking means therefor responsive to rotation of the members at other than the desired ratio for resisting the operation of said manually operable mechanism in proportion to the difference between the existing and desired speed ratios.

9. In a transmission, two rotatable members adapted to engage to form a drive, means for mutually engaging said members, and control means for resisting such engagement until said members are rotating at the proper speed ratio, the resistance offered by said control means being proportional to the departure from said proper speed ratios.

10. In a variable speed mechanism, driving and driven members, means including gearing for connecting said members to rotate at various speed ratios, means including an element controlled by the operator for shifting from one gearing to another, and means operated as an incident of said shifting operation for resisting the movement of said elements, the resistance of said means increasing with an increase in the difference between the existing and desired speed ratios and decreasing substantially to zero responsive to the establishment of the desired ratio.

11. The combination of two positive power transmitting elements one of which is movable into engagement with the other to establish a positive driving connection; a frictional element in positive torque transmitting relation to each power transmitting element, respectively, one movable into and out of driving engagement with the other to bring the power transmitting elements to substantially the same speeds prior to establishing a positive driving connection, one of said frictional elements being capable of a limited rotary and axial movement with respect to the power transmitting element with which it is in positive torque transmitting relation; and checking components movable respectively with said frictional element capable of said limited rotary movement and with said positive power transmitting element with which the former is in positive torque transmitting relation, said checking components being constructed and arranged to resolve an axial force applied to said movable positive power transmitting element into an axial force and a force acting at right angles thereto when said frictional element is at one limit of its said relative rotary movement.

12. The combination defined in claim 11 wherein the checking components are provided with surfaces inclined to the direction of movement of the movable positive power transmitting element.

13. A combination as defined in claim 11 wherein the friction element that has a limited rotary and axial movement with respect to the power transmitting element with which it is in positive torque transmitting relation is also in continuous frictional bearing engagement with the other power transmitting element.

14. A combination as defined in claim 11 wherein the friction element that is capable of a limited rotary and axial movement with respect to the power transmitting element with which it is in positive torque transmitting relation provided with a conical friction surface and a cylindrical surface and the companion friction element is provided with corresponding conical and cylindrical surfaces with which said conical and cylindrical surfaces of the other friction element are in constant bearing engagement.

15. The combination of two power transmitting members, one of which is adapted to drive the other, including toothed intermeshable elements connectible or disconnectible by relative movement of one toward or from the other; two friction members connected respectively to the two power transmitting members in such manner as to compel said friction members to be positively driven by said power transmitting members, said friction members being relatively movable into and out of frictional driving engagement one with the other; cooperating checking components comprising a detent element in driving relation to one of said toothed elements, a checking component in driving relation to one of said friction members, means whereby said checking components may be set in axial alinement in response to a difference in speed between said power transmitting members in order to oppose connection of said toothed intermeshable elements, and so constructed as to move out of axial alinement in respsonse to pressure exerted by the movement of the intermeshable elements toward intermeshing position when equal speeds of said power transmitting members is attained.

16. A combination as defined in claim 15 in which said friction member that is provided with a checking component is connected to one of said power transmitting members to be capable of a limited movement with respect thereto in the driving plane and also to be capable of moving at substantially right angles to the driving plane.

17. A combination as defined in claim 15 in which said friction element that is provided with a checking component is connected to one of said power transmitting members to be capable of a limited movement with respect thereto in the driving plane, and also capable of a limited movement substantially at right angles to the driving plane, said cooperating checking components having mutually contacting surfaces similarly inclined.

18. The combination of two coaxial rotary power transmitting members each provided with toothed clutch elements, said clutch elements being adapted to be engaged or disengaged by a relative axial movement; a pair of friction members positively connected respectively to rotate with said power transmitting members, adapted to be brought into engagement to equalize the speed of said power transmitting members, the connection of one of said friction members permitting a relative axial and limited angular movement of the latter with respect to the power transmitting member with which it is connected; said last named friction member and power transmitting member having coacting checking components effective when the friction member is at one end of its limited angular movement to oppose intermeshing of the toothed clutch elements, said checking components being constructed to resolve the force applied by movement of the toothed clutch elements toward intermeshing position into a force acting in an axial direction and a force acting tangentially to the path of rotation of said checking components.

19. A combination as defined in claim 18 in which two angularly spaced opposed checking components are provided on said checking component carrying friction member, and two corresponding checking components are provided on the power transmitting member by which said friction member is driven, in order that synchronization of the power transmitting members may be attained before positive clutching thereof in both senses of relative rotation.

20. Two power transmitting members each provided with a positive toothed element by which they may be connected in driving relation, and each provided with a friction synchronizing member by which they may be brought to substantially equal speed before intermeshing the positive toothed elements, one of said friction members being in fixed torque transmitting connection with one power transmitting member and the other friction member having a limited angular and an axial movement with respect to the other power transmitting member; cooperating checking components connected to move in unison with one of said friction members and one of said positive toothed elements, respectively, and adapted in response to a differential rotation of said power transmitting members to be moved one into the path of the other to oppose engagement of the positive toothed elements, and means responsive to the movement of said positive toothed elements toward engaging position to displace said detents with respect one to the other and permit engagement of the toothed elements after synchronization.

21. The combination of two coaxial rotary power transmitting members each having one element of a toothed clutch adapted to be intermeshed by a relative axial movement of one toward the other, a friction clutch member rigidly connected with one power transmitting member and a friction clutch member connected to the other power transmitting member to be positively rotated thereby, but capable of an axial and a limited angular movement with respect thereto, said last named power transmitting member and friction member having, respectively a cooperating passage and arm, cooperating inclined checking components at one edge of the arm and the corresponding passage, adapted to oppose intermeshing movement of the toothed clutch elements while said checking components are set in axial alinement due to unequal rotation of the power transmitting members, but adapted to be forced out of axial alinement by pressure exerted upon the movable toothed clutch element to permit the latter to be intermeshed with its companion clutch element when equal rotation of said power transmitting elements has been attained by engagement of the friction members.

22. A combination as defined in claim 21 in which said passage is provided with a checking component at each edge and said arm is provided with a corresponding checking component at each edge in order to effect equal speeds of the power transmission members before intermeshing of the toothed members in either sense of relative rotation.

23. The combination of two power transmitting members, one of which is adapted to drive the other, including toothed intermeshable elements connectible or disconnectible by relative movement of one toward or from the other; two mutually engageable and releasable friction members connected, respectively, to the two power transmitting members in such manner as to compel said friction members to be positively driven by said power transmitting members, one of said friction members being rotatively fixed to one of said power transmitting members and the other having a rotary lost motion connection with said other power transmitting member; and cooperating means on said lost motion connected friction member and one of said toothed intermeshable elements arranged to interpose a checking resistance to the intermeshing movement of one of said toothed elements when the friction member is at one limit of its rotary movement, with respect to the power transmiting member by which it is driven, during asynchronous rotation of said power transmitting members, and to release the checking opposition in response to axially exerted pressure of said toothed element during said intermeshing movement when the rotation of said power transmitting members is synchronous.

24. In power transmission mechanism, rotatable toothed driving and driven elements; means for moving one of said elements into or out of driving engagement with its companion; a checking device for obstructing interengagement of said toothed elements while the tooth speeds thereof are asynchronous; means on said checking device for resisting engaging movement of the movable toothed element in proportion to the difference in speed of said elements and cooperating means on one of said toothed elements constructed and arranged to displace the checking device in response to the movement of the movable toothed element toward its companion when the tooth speeds of said elements are synchronous.

25. In power transmission mechanism, co-operating rotary toothed driving and driven elements one of which is movable axially into and out of driving engagement with its companion, interposed displaceable checking means for resisting movement of the movable toothed element toward engagement with its companion, and cooperative parts respectively fixed relative to said checking means and one of said toothed elements for resolving the force due to the movement of the movable toothed element toward its companion into an axial force and a force tending to displace said cooperative parts and permit engagement of the driving and driven elements.

26. In power transmission mechanism, rotatable toothed driving and driven elements; means for moving one of said elements into and out of driving engagement with its companion; a checking device for obstructing interengagement of the said toothed elements while the tooth speeds thereof are asynchronous; means responsive to asynchronous rotation of said elements for setting said checking device in position to resist engaging movement of said movable element, and cooperating means on said checking device and on one of said elements constructed and arranged to displace the checking device and permit interengagement of said toothed elements in response to movement of the movable element toward its companion when the tooth speeds of said elements are synchronous.

27. The combination of two co-axial power transmitting members, each provided with a positive toothed clutch element adapted to be coupled or uncoupled; a pair of frictionally engageable members, one positively driven by each power transmitting member, respectively, and one of said positively driven frictionally engageable members being mounted to have a limited angular and an axial movement with respect to the power transmitting member by which it is positively driven; a detent element on said last named frictionally engageable member and a co-operative detent element on said last named power transmitting element, said detent elements being in alinement when the frictionally engageable member is at one end of its limited angular movement with respect to said last named power transmitting member, and being so constructed as to resolve the axial force exerted thereon in the relative movement of the positive clutch element toward intermeshing position into an axial force and a force acting tangentially to the arc of rotation of said detent elements, the zone of frictional engagement between said frictionally engageable members having a radial distance from the axis greater than that of said detent elements.

28. The combination of co-axial power transmitting members having toothed clutch elements, respectively, a friction clutch member fixed with respect to one of said toothed elements and a friction clutch member interposed between said toothed elements, said interposed friction clutch member having a lost motion positive driving connection with one power transmitting member and a frictional driving connection with the other, and inclined detent elements on the said interposed friction clutch member and the power transmitting member that drives it whereby to prevent coupling of the toothed clutch elements until equal speeds have been produced in the power transmitting members by engagement of the friction members.

In testimony whereof, I have signed my name to this specification this 3rd day of April 1924.

WALTER P. ALBERT.